US012563509B2

(12) United States Patent
Kurita et al.

(10) Patent No.: US 12,563,509 B2
(45) Date of Patent: Feb. 24, 2026

(54) RADIO COMMUNICATION NODE AND RADIO COMMUNICATION METHOD FOR CONFIGURING SYNCHRONIZATION SIGNALS

(71) Applicant: NTT DOCOMO, INC., Tokyo (JP)

(72) Inventors: Daisuke Kurita, Tokyo (JP); Mayuko Okano, Tokyo (JP); Hiroki Harada, Tokyo (JP); Satoshi Nagata, Tokyo (JP); Tomoya Ohara, Tokyo (JP); Masaya Okamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 3 days.

(21) Appl. No.: 18/565,454

(22) PCT Filed: May 31, 2021

(86) PCT No.: PCT/JP2021/020711
§ 371 (c)(1),
(2) Date: Nov. 29, 2023

(87) PCT Pub. No.: WO2022/254530
PCT Pub. Date: Dec. 8, 2022

(65) Prior Publication Data
US 2024/0259967 A1     Aug. 1, 2024

(51) Int. Cl.
*H04W 56/00*          (2009.01)
(52) U.S. Cl.
CPC ................................ *H04W 56/001* (2013.01)

(58) Field of Classification Search
CPC .... H04W 56/001; H04W 16/12; H04W 72/04
See application file for complete search history.

(56) References Cited

U.S. PATENT DOCUMENTS

| | | | |
|---|---|---|---|
| 2015/0117375 A1* | 4/2015 | Sartori | H04W 56/002 |
| | | | 370/329 |
| 2019/0045569 A1* | 2/2019 | Abedini | H04W 16/28 |
| 2019/0342801 A1* | 11/2019 | Cui | H04W 72/23 |
| 2020/0145961 A1 | 5/2020 | Harada et al. | |
| 2021/0014785 A1* | 1/2021 | Vaze | H04W 36/008357 |

FOREIGN PATENT DOCUMENTS

WO          2018/203408 A1     11/2018

OTHER PUBLICATIONS

International Search Report issued in PCT/JP2021/020711 on Dec. 28, 2021 (5 pages).
Written Opinion of the International Searching Authority issued in PCT/JP2021/020711 on Dec. 28, 2021 (3 pages).
White Paper on "5G Evolution and 6G", NTT DOCOMO, Inc., Feb. 2021 (Version 3.0) (73 pages).

* cited by examiner

*Primary Examiner* — Ivan O Latorre
(74) *Attorney, Agent, or Firm* — Osha Bergman Watanabe & Burton LLP

(57)          ABSTRACT

The radio communication node transmits and receives radio signals, and configures transmission and reception frequencies of the radio signals for each radio link or each radio communication node.

5 Claims, 6 Drawing Sheets

FIG. 2

RADIO COMMUNICATION NODE AND RADIO COMMUNICATION METHOD FOR CONFIGURING SYNCHRONIZATION SIGNALS

TECHNICAL FIELD

The present disclosure relates to a radio communication node and a radio communication method supporting a flexible network and a mesh network.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

In 6G, various use cases such as higher required performance, ultra-coverage expansion and ultra-long-distance communication, ultra-high capacity, ultra-reliable communication, virtual cell (User centric no cell), flexible network, mesh network/sidelink, etc. are assumed (Non-Patent Literature 1).

Regarding the initial access of the radio communication node (terminal (User Equipment, UE), a radio base station (may be an alias, such as gNB) and an communication device constituting an Integrated Access and Backhaul (IAB) may be included), it is inevitable to design considering such characteristics of 6G.

CITATION LIST

Non-Patent Literature

[Non-Patent Literature 1]
  "White Paper: 5G Evolution and 6G (3.0 edition)", [online], February 2021, NTT DOCOMO, INC., [retrieved May 20, 2021], Internet <URL: https://www.nttdoco-mo.co.jp/binary/pdf/corporate/technology/whitepaper_6g/
  DOCOMO_6G_White_PaperJP_20210203.pdf>

SUMMARY OF INVENTION

In flexible networks and mesh networks, flexible network functions are assumed to be arranged in combination with various network topologies.

Therefore, a radio communication node such as a terminal must be connected to a plurality of radio communication nodes having different functions (may be roles), types, and the like, and a plurality of radio links must be configured.

In such a case, when half-duplex communication is applied, the synchronization signal from the own node cannot be transmitted at the timing when the own node receives the synchronization signal. Therefore, the IAB has introduced a method to shift the transmission timing of the synchronization signal in the time direction for each radio communication node.

However, in this method to shift the transmission timing of the synchronization signal in the time direction, there is a problem that the measurement time increases with an increase in the number of radio communication nodes.

Therefore, the following disclosure has been made in view of this situation, and it is an object of the present invention to provide a radio communication node and a radio communication method capable of quickly establishing synchronization even when a plurality of radio communication nodes having different functions and types are connected and a plurality of radio links are configured.

An aspect of the present disclosure is a radio communication node (NW Node 100, UE200) provided with a transmission/reception unit (radio signal transmission and reception unit 110) that transmits and receives radio signals and a control unit (control unit 170) that configures transmission and reception frequencies of the radio signals for each radio link or each radio communication node.

An aspect of the present disclosure is a radio communication node (NW Node 100, UE200) provided with a transmission/reception unit (control signal and reference signal processing unit 140) that transmits and receives synchronization signals, and a control unit (control unit 170) that configures different transmission frequencies and measurement windows for the synchronization signals for each radio link or each radio communication node.

An aspect of the present disclosure is a radio communication method including the steps of transmitting/receiving a radio signal, and configuring transmission and reception frequencies of the radio signals for each radio link or each radio communication node.

An aspect of the present disclosure is a radio communication method including the steps of transmitting/receiving synchronization signals, and configuring different transmission frequencies and measurement windows for the synchronization signals for each radio link or each radio communication node.

BRIEF DESCRIPTION OF DRAWINGS

FIG. 2 is a functional block diagram of a NW node 100 and a UE200.

MODES FOR CARRYING OUT THE INVENTION

Figure 1:
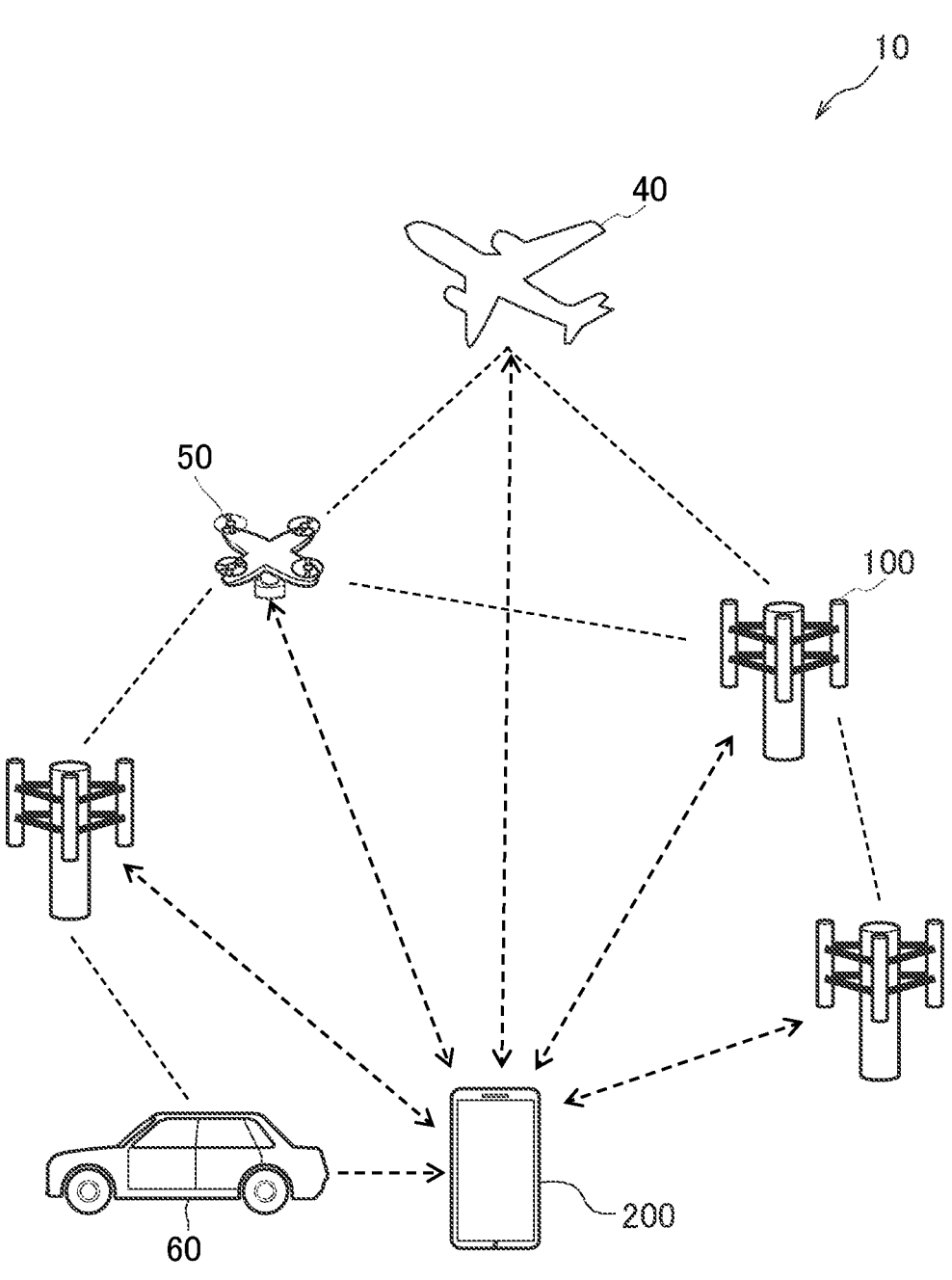
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of the radio communication system 10 according to the present embodiment. In the present embodiment, the radio communication system 10 is a radio communication system following a system called Beyond 5G, 5G Evolution or 6G, which is a successor to 5G New Radio (NR).

As shown in FIG. 1, the radio communication system 10 may comprise a plurality of radio communication nodes.

Specifically, the radio communication system 10 may comprise a plurality of network nodes 100 (NW node 100) and terminals 200 (User Equipment 200, hereinafter referred to as UE200, mobile station). The radio communication system 10 may include a core network (not shown) connected to an external network or the like, and a part (or all) of the radio access network constituted by the core network and/or radio communication nodes may be simply described as a "network".

The NW node 100 and the UE200 are a kind of radio communication nodes capable of executing radio communication. Both the NW node 100 and the UE200 are radio communication nodes, and need not be clearly distinguished. That is, the NW nodes 100 and the UE200 may function as network nodes or UEs (or both) depending on the type of communication, the application to be executed, the state of communication, the location, etc.

In addition to the NW nodes and user devices, the radio communication nodes may be referred to by other names that refer to devices that execute radio communication (mobile communication), such as nodes, network entities, network devices, communication device, etc.

In addition, the functions of such radio communication nodes may be provided while mounted on various mobile devices. For example, as shown in FIG. 1, the radio communication nodes may be mounted on an aircraft 40, a drone 50 and a vehicle 60, and the like.

The aircraft 40 is a transport means that carries a person or object and flies through the air, and may include balloons, airships, gliders, airplanes, helicopters, and the like. The altitude at which aircraft 40 can fly is not particularly limited, but an altitude of up to 10,000 m may be assumed.

The drone 50, like aircraft 40, fly in the air, but may be particularly interpreted as unmanned, remotely controlled or automatically controlled aircraft. However, the drone 50 may not necessarily be unmanned, remotely controlled or automatically controlled. In general, the flying altitude of the drone 50 may be lower than that of the aircraft 40. The drone 50 may be referred to as Unmanned Aerial Vehicles (UAV).

The vehicle 60 may be interpreted as vehicles powered on land, such as automobiles. The vehicle 60 may include a vehicle traveling on a track, such as a train. The radio communication node may be mounted on a ship at sea, not only on land.

The radio communication node may be mounted on a Geostationary Orbit (GEO), a Low Earth Orbit (LEO), or a High-Altitude Platform Station (HAPS). The HAPS may reside at a fixed location at an altitude of about 20 km, and may form a coverage area with a large cell radius (For example, more than 50 km) on land.

Thus, the radio communication system 10 may support coverage extension including non-terrestrial networks.

The radio communication node may also function as a radio relay device interposed between other radio communication nodes. The radio relay device may be referred to as a relay, repeater, or the like, and may be a component of an integrated access and backhaul (IAB) that integrates radio access to a terminal (User Equipment, UE) and a radio backhaul between radio communication nodes, such as a radio base station (For example, gNB).

The radio communication system 10 may correspond to a frequency band similar to the NR and may use a similar bandwidth (BW), subcarrier spacing (SCS). In addition, the radio communication system 10 may support higher frequency bands. Specifically, the radio communication system

10 may support higher frequency bands such as millimeter waves greater than 10 GHz. The bandwidth may be as low as a few 100 MHz.

The radio communication system 10 may also support functions related to enhanced Mobile Broadband (eMBB), URLLC (Ultra-Reliable and Low Latency Communications), and massive Machine Type Communication (mMTC) as well as NR. Cyclic Prefix-Orthogonal Frequency Division Multiplexing (CP-OFDM)/Discrete Fourier Transform-Spread (DFT-S-OFDM) with greater Sub-Carrier Spacing (SCS) may also be applied as well as NR.

In addition, in order to realize ultra-high-speed and large-capacity communication, Faster-than-Nyquist (FTN) signals which non-orthogonally compress and transmit signals using a sampling rate larger than the frequency bandwidth in the time domain may be used.

The time domain may be referred to as a time direction, a time component, a symbol period or a symbol time. The symbol period may be referred to as a symbol length, a time direction or a time domain. The frequency domain may be referred to as a frequency direction, a frequency component, a frequency domain, a resource block, a resource block group, a subcarrier, a Bandwidth part (BWP), a subchannel, a common frequency resource or the like.

The radio communication system 10 may also support Massive MIMO (mMIMO), which, like NR, generates a more directional beam by controlling radio signals transmitted from multiple antenna elements; Carrier Aggregation (CA), which bundles multiple component carriers (CCs); and Dual Connectivity (DC), which communicates simultaneously between the UE and each of the multiple radio communication nodes.

As shown in FIG. 1, in the radio communication system 10, each radio communication node may be connected to the multiple radio communication nodes simultaneously to form a mesh-type network (mesh network) that can form various connection paths (communication paths).

Further, as described above, the functions (roles) and types provided by each radio communication node may be changed to flexible depending on the situation, etc., and the arrangement of flexible network functions may be realized in combination with various network topologies. Such a network may be referred to as a flexible network.

For example, the radio access technology (RAT) employed in the radio communication system 10 may enable a distributed network in the spatial domain to be more sophisticated, that is, to communicate as close as possible and in a line-of-sight environment (paths with less loss), and to create as many communication channels as possible to provide more path choice (more redundancy).

In order to realize such a flexible network or mesh network, distributed antenna deployment in which a large number of antenna devices are distributed and deployed, placement of a RIS (Reconfigurable Intelligent Surface) for improving radio performance, and cooperative transmission and reception technology between terminals (radio communication nodes) may be applied.

(2) Function Block Configuration of Radio Communication System

Figure 2:
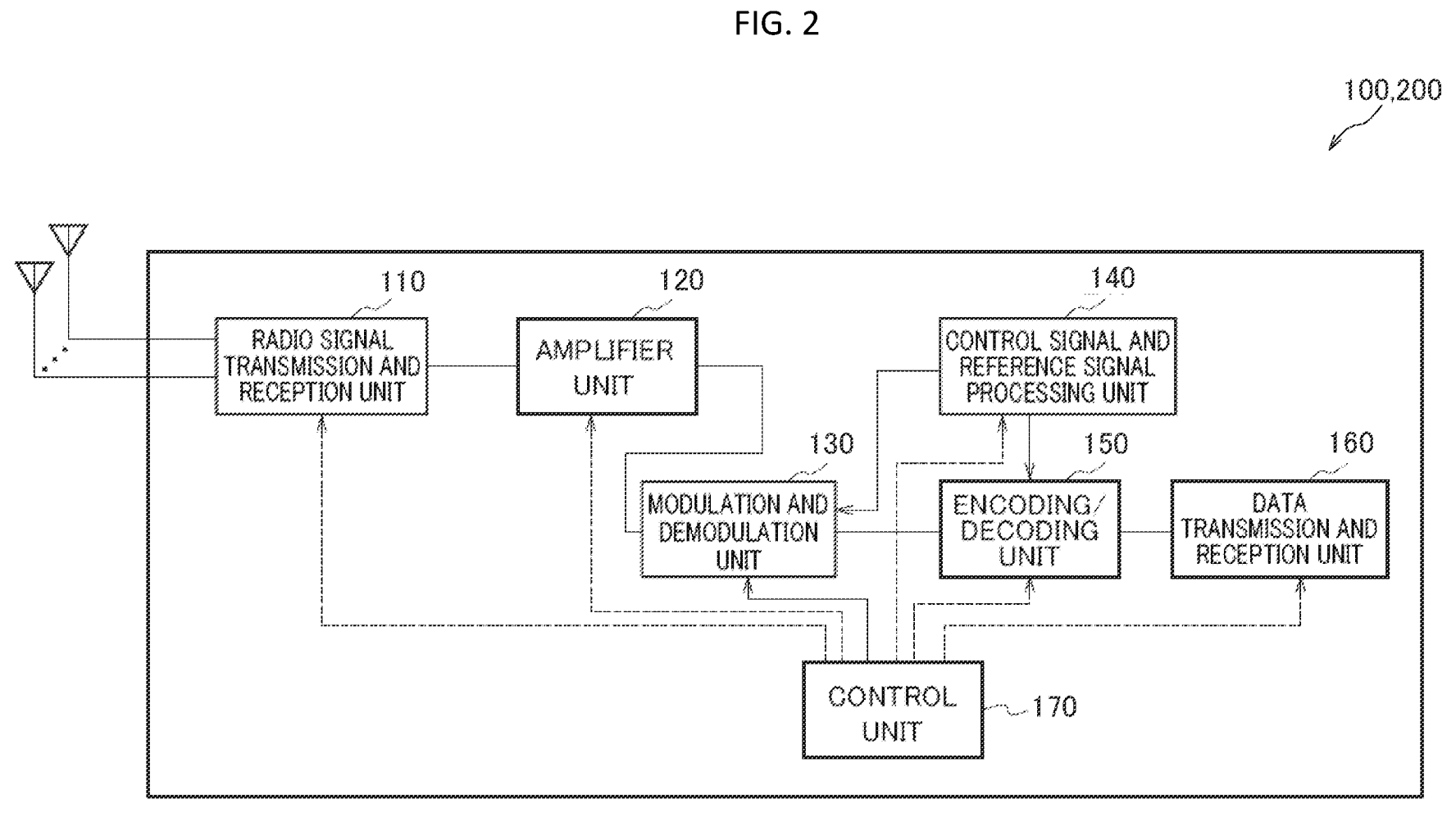

Next, a functional block configuration of the radio communication system 10 will be described. Specifically, a functional block configuration of the NW node 100 will be described. FIG. 2 is a functional block configuration diagram of the NW node 100 and the UE200.

As shown in FIG. 2, the NW node 100 includes a radio signal transmission and reception unit 110, an amplifier unit 120, a modulation and demodulation unit 130, a control signal and reference signal processing unit 140, encoding/decoding unit 150, a data transmission and reception unit 160, and a control unit 170.

Figure 3:
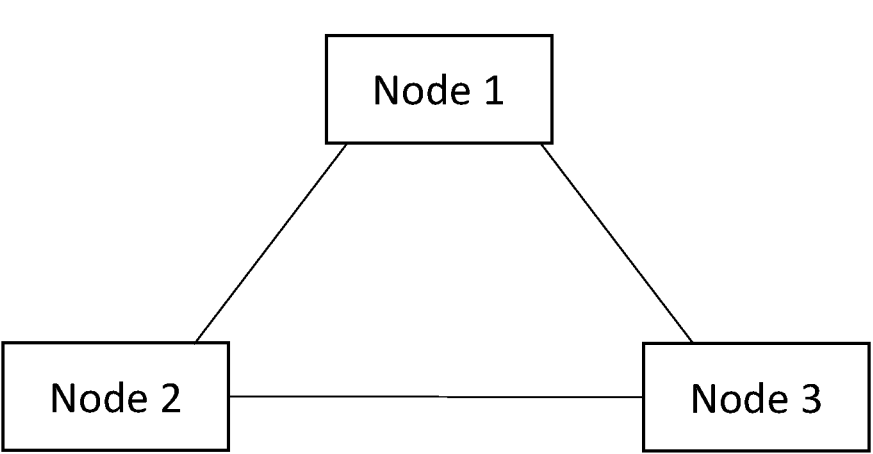
FIG. 3 is a diagram showing an example of allocation of a synchronization signal in a mesh network.
Figure 3:
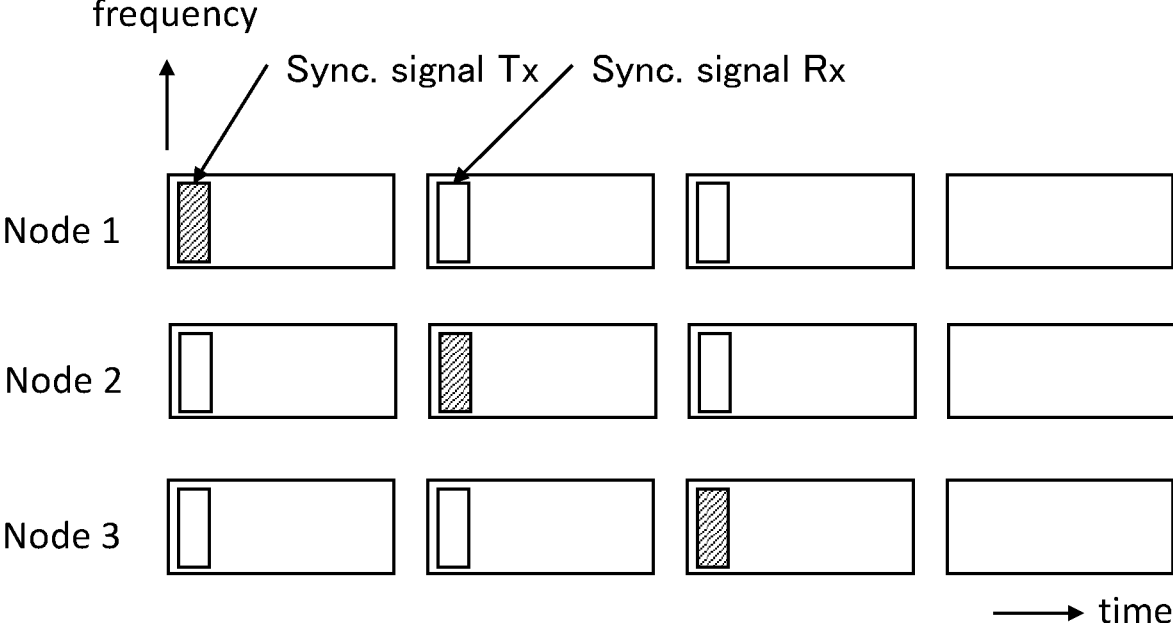

Note that in FIG. 2, only the main functional blocks related to the description of the embodiment are shown, and the NW node 100 (UE200) has other functional blocks (For example, the power supply unit). FIG. 3 also shows the functional block configuration of the NW node 100, and refer to FIG. 6 for the hardware configuration.

The radio signal transmission and reception unit 110 transmits and receives radio signals in accordance with the 6G RAT. In this embodiment, the radio signal transmission and reception unit 110 may constitute a transmission/reception unit for transmitting and receiving radio signals. The radio signal transmission and reception unit 110 may support half-duplex and full-duplex communications. In half-duplex communication, transmission and reception of a radio signal (which may be read as radio link or channel) cannot be performed simultaneously, and only transmission or reception (DL or UL) of a radio signal can be performed in a predetermined time region (timing).

The radio signal transmission and reception unit 110 may support Massive MIMO to generate a more directional beam by controlling radio (RF) signals transmitted from multiple antenna elements, Carrier Aggregation (CA) to bundle multiple component carriers (CCs), and Dual Connectivity (DC) to simultaneously communicate between two NW nodes 100 (or UE200).

The amplifier unit 120 is configured with a PA (Power Amplifier)/LNA (Low Noise Amplifier) or the like. The amplifier unit 120 amplifies the signal output from the modulation and demodulation unit 130 to a predetermined power level. The amplifier unit 120 amplifies the RF signal output from radio signal transmission and reception unit 110.

The modulation and demodulation unit 130 performs data modulation/demodulation, transmission power setting, resource block allocation, etc. for each specific communication destination (UE200).

The control signal and reference signal processing unit 140 performs processing on various control signals transmitted and received by the NW node 100. Specifically, the control signal and reference signal processing unit 140 receives various control signals transmitted from the UE200 over the control channel, such as radio resource control layer (RRC) control signals. The control signal and reference signal processing unit 140 also transmits various control signals to the UE200 over the control channel.

The control signals may include downlink control information (DCI) and uplink control information (UCI).

The DCI may be interpreted as control information transmitted on the downlink (DL) that includes at least any of the scheduling information, data modulation and channel coding rate information required for each UE200 (or NW node 100) to demodulate data.

The UCI may be interpreted as control information transmitted on the uplink (UL) that includes at least any of the Hybrid automatic repeat request (HARQ) ACK/NACK, scheduling request (SR) from the UE200 (or NW node 100) and channel state information (CSI).

In addition, the control signal and reference signal processing unit 140 may perform processing using a reference signal (RS) such as a Demodulation Reference Signal and a Phase Tracking Reference Signal (PTRS).

The DMRS is a reference signal (pilot signal) known between a base station and a terminal for each terminal to estimate a fading channel used for data demodulation. The PTRS is a reference signal for each terminal to estimate phase noise, which is a problem in a high frequency band.

In addition to the DMRS and the PTRS, the reference signal may include a Channel State Information-Reference Signal (CSI-RS), a Sounding Reference Signal (SRS), and a Positioning Reference Signal (PRS) for position information.

The channel includes a control channel and a data channel. The control channel includes PDCCH (Physical Downlink Control Channel), PUCCH (Physical Uplink Control Channel), PRACH (Physical Random Access Channel), PBCH (Physical Broadcast Channel), and the like.

The data channel includes PDSCH (Physical Downlink Shared Channel), PUSCH (Physical Uplink Shared Channel), and the like. The signal may include a channel and a reference signal.

Although the names of the reference signal and the channel are in line with the NR, they may be called by other names having the same effect, and the names of the layers described later may be called by other names having the same effect.

The control signal may include a synchronization signal used for establishing synchronization between radio communication nodes. The control signal and reference signal processing unit 140 can transmit and receive synchronization signals. In the present embodiment, the control signal and reference signal processing unit 140 may comprise a transmission/reception unit for transmitting and receiving synchronization signals.

In the radio communication system 10, synchronization signals of different configurations (or types), that is, multiple types of synchronization signals, may be used depending on the function, role, operating state, position, usage environment, etc., of the radio communication node. Alternatively, the synchronization signals may be the same regardless of the function of the radio communication node, etc. The network may also indicate whether a plurality of synchronization signals are to be used separately or whether a single synchronization signal is to be used. Examples of the configuration of the synchronization signals will be described later.

The control signal and reference signal processing unit 140 may report to the network the capability of its own node with respect to configurations for each radio link or radio communication node related to transmission and reception of the synchronization signals. For example, control signal and reference signal processing unit 140 may report capability information (May be referred to as UE Capability Information or simply Capability Information) indicating a corresponding communication method (such as time division multiplexing (TDD), frequency division multiplexing (FDD), and the like), a resource in the frequency and/or time direction capable of transmitting and receiving the synchronization signals (such as a measurement window), and the like. Specific examples of capability information will be described later.

The control signal and reference signal processing unit 140 may receive information necessary for establishing synchronization with the radio communication node or other radio communication nodes from the radio communication node corresponding to the radio base station (gNB). The information may include, for example, the time and/or frequency domain to which the synchronization signal is assigned, the signal sequence (number of bits, etc.), the modulation method, the coding law, etc.

The encoding/decoding unit 150 performs data division/concatenation and channel coding/decoding for each specific communication destination (UE200).

Specifically, the encoding/decoding unit 150 divides the data output from the data transmission and reception unit 160 into predetermined sizes and performs channel coding on the divided data. The encoding/decoding unit 150 decodes the data output from the modulation and demodulation unit 130 and concatenates the decoded data.

The data transmission and reception unit 160 transmits and receives the protocol data unit (PDU) and the service data unit (SDU). Specifically, the data transmission and reception unit 160 performs assembly/disassembly of the PDU/SDU in a plurality of layers (Media access control layer (MAC), radio link control layer (RLC), packet data convergence protocol layer (PDCP), etc.).

The control unit 170 controls each function block constituting the NW node 100. In particular, in the present embodiment, the control unit 170 executes control concerning synchronization of the NW node 100.

Specifically, the control unit 170 can perform the control necessary for the NW node 100 to establish synchronization with other radio communication nodes. Synchronization establishment may mean that communication can be performed with the radio communication node at the connection destination (communication destination) via a specific control channel or data channel. In other words, it may be interpreted as a state in which control data or user data can be transmitted or received in a specific time and/or frequency domain.

As discussed above, Half-duplex may also be applied in the radio communication system 10, but even in this case, the timing of transmission and reception of the synchronization signal may be adjusted so as not to collide between the radio communication nodes. For example, a method of shifting the timing of transmission of the synchronization signal in the time direction for each radio communication node may be applied.

In order to avoid such collision of the synchronization signal, the control unit 170 may configure the transmission frequency and the reception frequency of the radio signal for the radio link or radio communication node (For example, the radio communication node to which it is connected) to which the synchronization signal is transmitted and received. The control unit 170 may configure only either the transmission frequency or the reception frequency.

For example, the control unit 170 may configure different transmission frequencies for each radio communication node, or may replace frequencies (or frequency bands) used for transmission or reception according to the number of communication hops to the target radio communication node.

The control unit 170 may also configure different transmission frequencies and measurement windows for synchronization signals for each radio link or radio communication node. Specifically, the control unit 170 may include information about frequency and time resources in the contents of the transmission configuration (STC: SSB transmission configuration) of the synchronization signals.

The STC is a configuration about the transmission of the synchronization signal block (SSB: SS (Synchronization Signal)/PBCH (Physical Broadcast CHannel) Block) of the NR, and the same transmission configuration is applied to the radio communication system 10, and the configuration may include information about frequency and time resources.

In addition, the measurement window (which may be called the reception window) may be configured in the same way as, for example, the measurement window (SMTC window) which can be configured for each carrier (which may be called a subcarrier) called the SSB-based RRM Measurement Timing Configuration (SMTC) of the NR.

The control unit 170 may configure the configuration (SMTC window) related to the measurement of the synchronization signal to the same timing as the transmission resource of the synchronization signal. That is, the transmission resource (May include a frequency direction and a time direction, but may not have a time direction) of the synchronization signal may be configured to the timing included in the SMTC window.

The function related to the synchronization of the NW node 100 described above may also be provided in the UE200.

(3) Operation of Radio Communication System

Next, the operation of the radio communication system 10 will be described. Specifically, an operation example concerning synchronization between radio communication nodes in the radio communication system 10 will be described.

As described above, in the radio communication system 10, a mesh network may be configured, but a plurality of radio links (communication links) are established by connecting the radio communication nodes constituting the mesh network to a plurality of radio communication nodes (Hereinafter, nodes and nodes are omitted as appropriate.) having different roles (functions) or types.

FIG. 3 shows an example of allocation of a synchronization signal in a mesh network. In the mesh network as shown in FIG. 3, when each node (Node 1~3) synchronizes time and frequency between nodes by using a synchronization signal for each communication link, and each node operates in half-duplex communication, the node cannot transmit the synchronization signal at the timing when the node receives the synchronization signal from other nodes.

To avoid such a restriction, there is a method in which the transmission timing of the synchronization signal is intentionally shifted in the time direction for each node. For example, in IAB of 3GPP Release-16, the timing of transmitting the synchronization signal (STC: SSB transmission configuration) and the timing of measuring the synchronization signal (SMTC: SSB based RRM Measurement Timing Configuration) can be configured for each node.

On the other hand, if the transmission timing of the synchronization signal is shifted in the time direction for each node, the time of measuring the synchronization signal increases with an increase in the number of connected nodes, as in a mesh network.

In the following operation example, by frequency division multiplexing (FDM) between transmission and reception of the synchronization signal, the measurement period of the synchronization signal is shortened, and FDM operation of the node is realized.

(3.1) Operation Overview

In the case where one terminal (UE200) is connected to a plurality of radio communication nodes (Hereinafter, which may be properly abbreviated as nodes) having different functions in a flexible network or a mesh network, an operation example concerning FDM for transmission and reception of synchronization signals will be described below.

Specifically, the following operation example will be described.

(operation example 1): For each radio link or node, the transmission frequency and the reception frequency of the radio signal for each radio link or node can be configured.

·(operation example 2): For each radio link or node, the transmission frequency and the reception window (measurement window) of the different synchronization signals are configured.

(operation example 3): UE200 (node) reports the capability (Capability) of the synchronization signal.

(3.2) Example 1

In this example, for each radio link (May be referred to as a communication link, hereinafter the same) or node, the transmission frequency and the reception frequency assigned to the radio link or node can be configured.

For example, a different transmission frequency may be configured for each node, or the transmission/reception frequency may be swapped according to the number of communication hops to the connection destination node (number of routing nodes).

Figure 4:
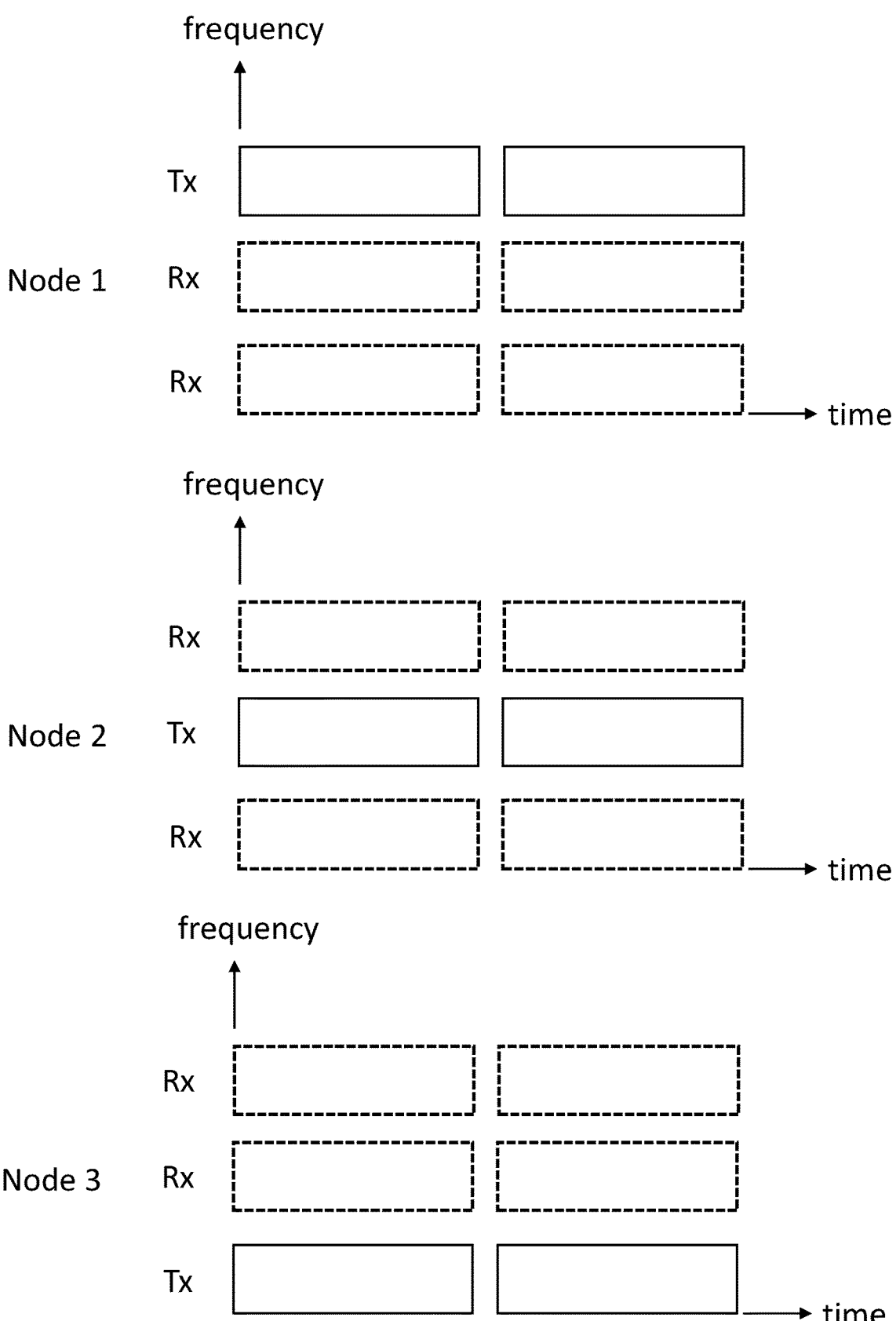
FIG. 4 is a diagram showing an example of assignment of transmission frequencies and reception frequencies by node according to operation example 1.

FIG. 4 shows an example of assignment of transmission and reception frequencies for each node according to operation example 1. As shown in FIG. 4, the transmission frequency may be different for each node. The configuration of the transmission frequency and the reception frequency may be in accordance with any of the following.

(i) Configured by the higher node (the node corresponding to the core network or gNB)

(ii) Configured by the connection destination node (iii) Configured by the own node according to the connection status The transmit and receive frequencies may be configured using F1-AP, RRC, MAC-CE (Control Element) or DCI according to any of the following:

(i) Explicitly configuration of the transmit and receive frequencies

For example, the start resource block (RB) and the number of RBs may be notified respectively.

(ii) Explicitly configuration of either the transmit frequency or the receive frequency For example, if the transmit frequency is explicitly configured, frequencies that are not explicitly configured may be interpreted as receiving frequencies.

The transmission frequency and the reception frequency may be configured permanently or in units of a predetermined period. For example, different transmission and reception frequencies may be configured for the period during which the synchronization signal is transmitted and for other periods.

(3.3) Example 2

In this example, the transmission frequency and reception window (measurement window) of the synchronization signal may be configured differently for each communication link or node.

Figure 5:
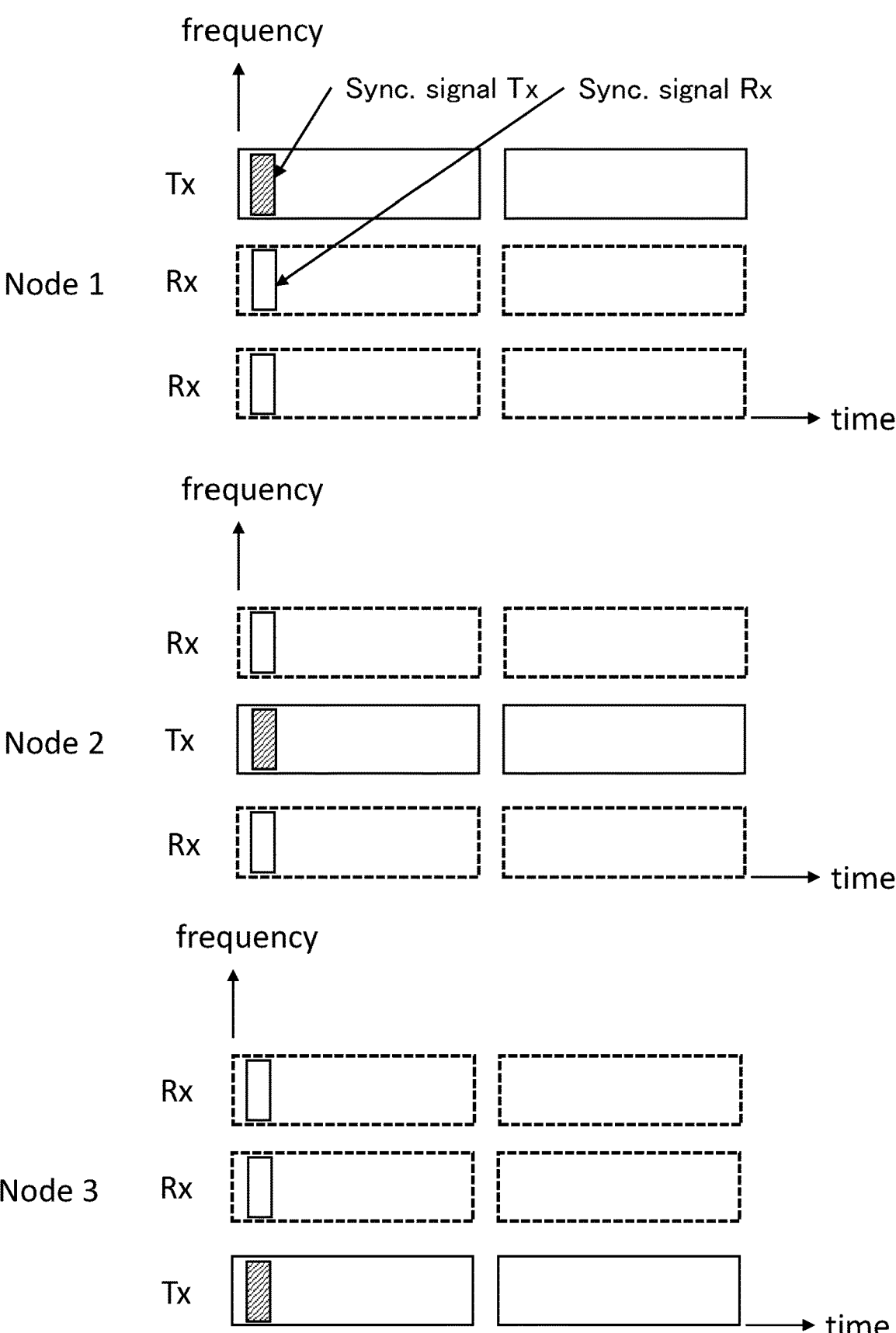
FIG. 5 is a diagram showing an example of assignment of transmission frequencies and reception frequencies for each node according to the operation example 2.

FIG. 5 shows an example of assignment of the transmission frequency and reception frequency for each node according to the example 2. In this example, the content of the transmission configuration (STC) of the synchronous signal may include information about the frequency and/or time resources.

Information about frequency and/or time resources may be configured using F1-AP, RRC, MAC-CE (Control Element) or DCI and may be configured according to either:

(i) Explicitly Configuration of the Transmission Frequency and Timing

For example, the transmission frequency may be configured using the starting resource block (RB) and the number of RBs, and the transmission timing may be configured using the frame slot number and the amount of offset from the received SSB.

(ii) Configuration of Only the Transmission Timing

In this case, the transmission frequency may be determined in accordance with the frequency configured as the configured transmission resource. For example, it may be uniquely defined by the configuration, it may be configured in accordance with the frequency of the received synchronization signal, or it may be arbitrarily configured by the node.

(iii) Only the Transmission Frequency is Configured

In this case, the transmission timing may be determined in accordance with the reception timing of the synchronization signal. For example, it may be uniquely determined by the configuration, it may be configured in accordance with the timing of the received synchronization signal, or it may be arbitrarily configured by the node.

The configuration (SMTC window) for the measurement of the synchronization signal may be configured at the same timing as the transmission resource of the synchronization signal. Specifically, the transmission resource (May include a frequency direction and a time direction, but may not have a time direction) of the synchronization signal may be configured at a timing included in the SMTC window.

The measurement timing (measurement window) may be configured explicitly or implicitly (Match the transmission timing, for example).

(3.4) Example 3

In this example, the radio communication node (which may include a terminal) may report to the network and/or other radio communication node the transmission and reception frequencies for each node or radio link (DL/UL), and the capability (Capability) with respect to synchronization signals and measurement window (reception window) configurations.

Specifically, the radio communication node may report the following information as UE Capability Information (It can simply be Capability Information) to the network or the like.

Applicability of transmit and receive signals for each node/link

Applicability of frequency configuration of different synchronization signals for each node/link Applicability of measuring window of different synchronization signals for each node/link In addition, the radio communication node may report the corresponding (supported) frequency (which may be a frequency range (FR) or a band) by any of the following methods:

Whether all frequencies can be supported (whether the node can be supported as a radio communication node)

Whether each frequency can be supported

Whether each FR can be supported

In addition, the radio communication node may report the corresponding duplex method by any of the following methods.

Whether the duplex method can be supported by the radio communication node

Whether each duplex (TDD/FDD) method can be supported

(4) Operational Effects

According to the above-described embodiment, the following effects can be obtained. Specifically, for each radio link or radio communication node (For example, the radio communication node to which it is connected), the radio communication node (which may include the NW node 100 and the UE 200) can configure the transmission frequency and the reception frequency of the radio signal for the radio link or radio communication node.

The radio communication node can configure different transmission frequencies and measurement windows for synchronization signals for each radio link or radio communication node.

Therefore, even when connecting to a plurality of radio communication nodes with different functions, types, etc. and configuring a plurality of radio links, FDM can be applied and synchronization can be established quickly.

In this embodiment, the radio communication node may report to the network the capability of its own node with respect to the radio link related to the transmission and reception of synchronization signals or the configuration of each radio communication node. Therefore, the configuration related to the transmission and reception of appropriate synchronization signals according to the capability of the radio communication node may be applied.

(5) Other Embodiments

Although the embodiments have been described above, they are not limited to the description of the embodiments, and it is obvious to those skilled in the art that various modifications and improvements can be made.

For example, in the embodiment described above, the term radio communication node (NW node) was used, but as described above, it may be replaced by other similar terms such as network devices.

In the embodiment described above, the terms downlink (DL) and uplink (UL) were used, but may be referred to in other terms. For example, they may be replaced or associated with terms such as forward ring, reverse link, access link, backhaul, etc. Alternatively, terms such as first link, second link, first direction, and second direction may be used.

In the above description, configure, activate, update, indicate, enable, specify, and select may be interchanged. Similarly, link, associate, correspond, and map may be interchanged, and allocate, assign, monitor, and map may be interchanged.

In addition, specific, dedicated, UE-specific, and UE-specific may be interchanged. Similarly, common, shared, group-common, UE-common, and UE-shared may be interchanged.

Further, the block configuration diagram (FIG. 2) used in the description of the above-described embodiment shows blocks of functional units. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (configuration part) that functions transmission is called a transmission unit (transmitting unit) or a transmitter. As described above, the method of realization is not particularly limited.

Figure 6:
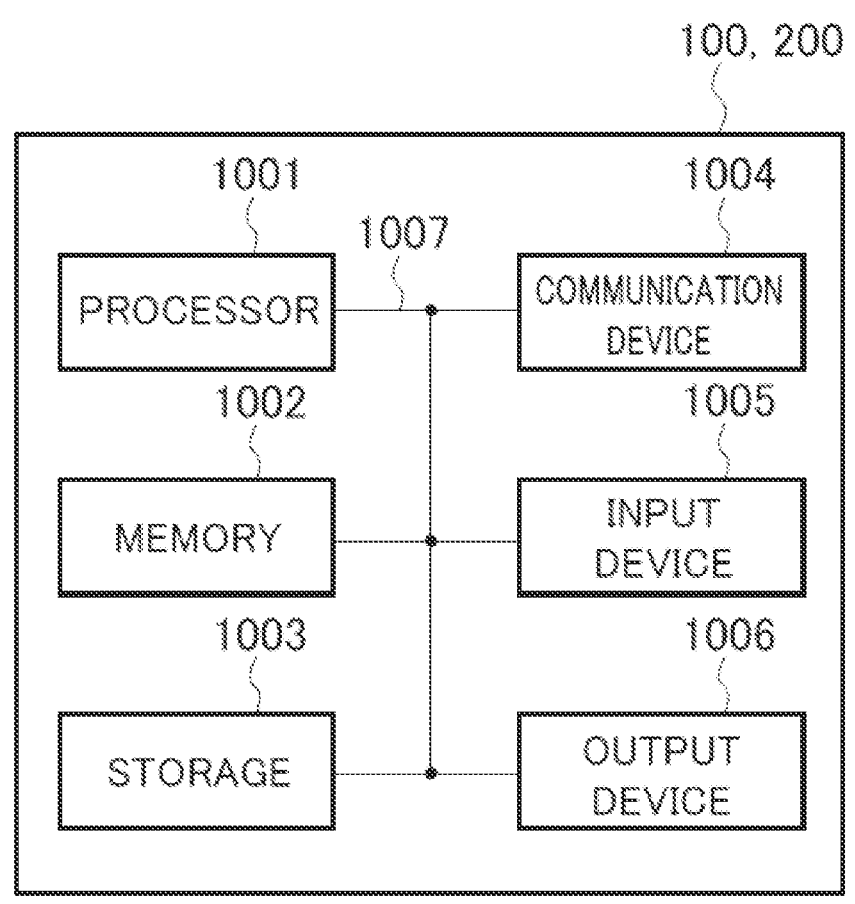
FIG. 6 is a diagram showing an example of a hardware configuration of the NW node 100 and the UE200.

In addition, the NW node 100 and UE200 (the device) described above may function as computers for processing the radio communication method of the present disclosure. FIG. 6 is a diagram showing an example of a hardware configuration of the device. As shown in FIG. 6, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 2) is implemented by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001, for example, operates an operating system to control the entire computer. The processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE- PROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

The notification of information is not limited to the aspects/embodiments described in the present disclosure and may be carried out using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals or combinations thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc. of the embodiments/embodiments described in the present disclosure may be rearranged as long as there is no conflict. For example, the method described in the present disclosure presents the elements of the various steps using an exemplary sequence and is not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from a higher layer (or lower layer) to a lower layer (or higher layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the embodiments/embodiments described in the present disclosure may be used alone, in combination, or alternatively with execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, planes, etc.), an unmanned mobile (For example, drones, self-driving cars), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the s same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, up channels, down channels, etc. may be replaced with side channels (or side links).

Similarly, mobile stations in the present disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may be of a fixed time length (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in units of time greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframe and the TTI may be a subframe (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to transmit and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
40 aircraft
50 drone
60 vehicle
100 NW node
110 radio signal transmission and reception unit
120 amplifier unit
130 modulation and demodulation unit
140 control signal and reference signal processing unit
150 encoding/decoding unit
160 data transmission and reception unit
170 control unit
200 UE
1001 processor
1002 memory
1003 storage
1004 communication device
1005 input device
1006 output device
1007 bus

The invention claimed is:

1. A terminal comprising:
a transceiver that transmits and receives synchronization signals; and
a processor that configures different transmission frequencies and measurement windows for the synchronization signals for each radio link or each radio communication node in a plurality of radio communication nodes of a network comprising the terminal,
wherein:
the transmission frequencies are configured using a starting resource block and a number of resource blocks, and
the measurement windows are configured using a frame slot number and an offset from a received synchronization signal block.

2. A radio communication method comprising:
transmitting/receiving synchronization signals using a terminal of a network; and
configuring, using the terminal, different transmission frequencies and measurement windows for the synchronization signals for each radio link or each radio communication node in a plurality of radio communication nodes of the network,
wherein:
the transmission frequencies are configured using a starting resource block and a number of resource blocks, and
the measurement windows are configured using a frame slot number and an offset from a received synchronization signal block.

3. The terminal of claim 1, wherein the transceiver reports to the network the terminal's capability to configure for each radio link or each radio communication node.

4. The terminal of claim 1, wherein the processor is further configured to replace transmission frequencies according to a number of communication hops to at least one radio communication node.

5. The method of claim 2, further comprising replacing, using the terminal, transmission frequencies according to a number of communication hops to at least one radio communication node.

* * * * *